June 28, 1932.  A. MOORHOUSE  1,865,130
STEERING COLUMN SETTING
Filed April 26, 1930
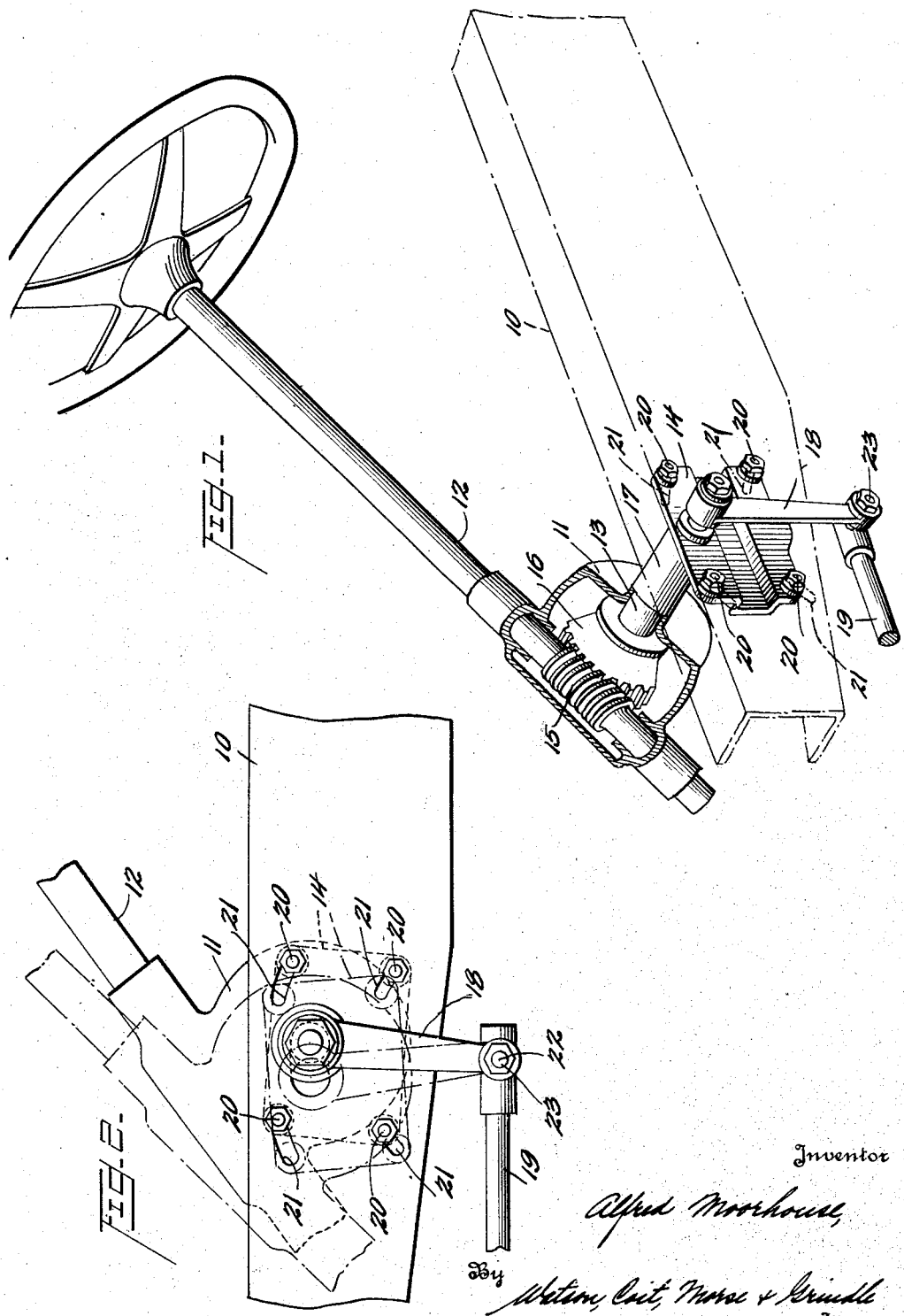

Patented June 28, 1932

1,865,130

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

STEERING COLUMN SETTING

Application filed April 26, 1930. Serial No. 447,678.

The present invention relates to motor vehicles, and particularly to motor vehicle steering mechanisms.

It is now generally standard practice, in constructing motor vehicle steering mechanisms, to connect the customary steering wheel and shaft to the conventional drag link of the steering gear by means of a driving connection which includes an irreversible gearing, that is, a gearing which prevents the road shocks imparted to the forward or steering wheels from being transmitted rearwardly to the hands of the operator. It is also customary to so mount the steering shaft that its angular position relative to the frame may be altered to a limited extent so that the steering wheel may be adjusted to various elevations to suit the needs of drivers of varying stature.

In the general case, the steering shaft is rotatably mounted in a casing, which casing also encloses the irreversible gearing, generally a worm on the steering shaft and a sector on a rock shaft disposed transversely to the steering shaft, the casing being secured to a side frame member of the vehicle in such manner that it may be adjusted about an axis transverse to the vehicle in order to permit angular adjustment of the steering shaft. In all such steering mechanisms, however, adjustment of the angular position of the steering shaft has necessitated adjustment of the parts of the irreversible gearing relatively to each other, as, for instance, rotation of the worm to a new neutral or "straight ahead" position relatively to the sector, the irreversible gearing constituting a locking means, preventing relative rotation of the casing and steering arm, and the steering arm being angularly non-adjustable because of its connection to the drag link.

The present invention contemplates an improvement in the means for supporting the steering mechanism upon the frame and contemplates a connection of such character as to permit angular adjustment of the steering shaft without necessitating adjustment of the relative positions of the cooperating parts of the irreversible gearing. That is, the shaft, casing, and associated elements may be bodily moved in effecting adjustment, the various parts of the mechanism occupying the same relative positions for all possible adjustments thereof. The nature of the invention will be more clearly understood after a preferred embodiment of the same, which is illustrated in the accompanying drawing, is described in detail, and such detailed description is set forth in the following paragraphs.

In said drawing:

Figure 1 is a perspective view partly broken away of a portion of a motor vehicle steering mechanism, showing the manner in which the same is adjustably supported upon a side frame member of the vehicle; and Figure 2 is a side elevation of a portion of this mechanism, showing the steering column in different positions of adjustment.

A channel-shaped side frame member is indicated at 10 in the drawing, and the casing which houses certain portions of the steering mechanism and supports other portions thereof is generally indicated at 11. It will be appreciated that the frame member and casing may differ widely in configuration and details of construction inasmuch as the invention is applicable to all types of motor vehicles and many types of steering mechanisms.

In that embodiment of the invention which is illustrated, the casing rotatably supports the steering shaft 12 and the rock shaft 13, and a portion of the casing comprises a flange-like member 14 adapted to be secured rigidly to the side frame member 10, member 14 in reality comprising the supporting base for the casing and steering column. In the drawing a steering mechanism of the worm and sector type is shown, the steering shaft having fixed thereon the worm 15 and the rock shaft 13 having fixed thereon a sector 16, the teeth of which mesh with the worm 15. Rock shaft 13 is rotatably supported in a tubular portion 17 of the casing and projects through the flange 14 and through the side frame member 10, having secured upon its outer end the steering arm 18.

To the lower end of the steering arm is connected, in the usual manner, the rear end of the steering drag link 19. It will be understood that the steering drag link is connected to a steering lever adjacent the front axle and that the two front wheels of the motor vehicle are simultaneously turned when the steering drag link is moved forwardly or rearwardly. The flange 14 of casing 11 is secured to the web of the channel-shaped side frame member 10 by bolts indicated at 20, these bolts extending through circular apertures formed in the plate 14 and through slots 21 formed in the web of the side frame member. As will be apparent from an inspection of the drawing, the slots 21 are arc-shaped, the side walls of each slot being curved about an axis located at the lower end of the steering arm 18, such as a horizontal line transverse to the side frame member and passing through the point 22, this point being the axis of the short spindle-like member 23 secured in the lower end of the steering arm which projects toward the drag link 19. The drag link 19 is pivotally attached to the end of this member 23 in well-known manner.

It will be clear that, as the result of this construction, the entire casing 11 with its associated mechanism, such as the steering shaft 12, may be adjusted in a fore and aft direction about the point 22 as a center, that is, about a horizontal line normal to the side frame member and passing through this point, and secured in any desired position of adjustment. The two extreme positions of adjustment are indicated in Figure 2. In effecting such adjustment, the casing, steering arm, and steering shaft may be swung bodily, and hence it is not necessary to rotate shaft 12 or effect change of relative positions of the worm and sector as is found necessary in effecting similar adjustments with other types of steering mechanisms, not so supported on the frame of the vehicle.

By mounting the steering mechanism in the manner set forth, a number of advantages are realized. For instance, it is possible to effect adjustment of the steering shaft without angularly adjusting the steering wheel, which is fixed to its upper end. The steering wheels are spoked, generally having three or four spokes, and it is considered desirable to have the spokes bear the same angular relationship to the driver for all angular positions of the steering shaft. Thus, if the uppermost spoke is originally disposed in a vertical plane which includes the axis of the steering shaft, when the front wheels are in a "straight ahead" position, it remains in such position even though the angular position of the steering shaft be changed. Adjustment of the steering column does not therefore cause the spokes to assume angles which are new and unfamiliar to the driver.

Having thus described the invention, what is claimed as new and desired to be secured by Letters Patent is:

1. In a motor vehicle, the combination with a frame member and a steering drag link, of a steering mechanism comprising essentially a steering shaft, a rock shaft, a driving connection between the steering shaft and rock shaft which includes a worm and member meshing therewith, and a steering arm fixed on the rock shaft to the free end of which the drag link is pivotally connected, and means for securing the aforementioned steering mechanism to the frame member in such manner that it may be swung about the point of connection of the drag link and steering arm as a center to a desired position of adjustment and rigidly secured in such position.

2. In a motor vehicle, the combination with a frame member and a steering drag link, of a steering mechanism comprising a steering shaft, a rock shaft, a driving connection between the steering shaft and rock shaft, and a steering arm fixed on the rock shaft to the free end of which the drag link is pivotally connected, and means for securing the steering mechanism to the frame member in such manner that it may be swung about the point of connection of the drag link and steering arm as a center to a desired position of adjustment, and rigidly secured in such position.

3. In a motor vehicle, the combination with a frame member and a steering drag link, of a steering mechanism comprising a steering shaft, a steering arm to one end of which the drag link is pivotally connected, a driving connection between the steering shaft and steering arm, and means for securing the steering mechanism to the frame member in such manner that it may be swung about the point of connection of the drag link and steering arm as a center, to a desired position of adjustment, and rigidly secured in such position.

4. In a motor vehicle, the combination with a frame member and a steering drag link, of a steering mechanism comprising a steering shaft, a steering arm to one end of which the drag link is pivotally connected, a driving connection between the steering shaft and steering arm, and means for securing the steering mechanism to the frame member in such manner that it may be swung about the point of connection of the drag link and steering arm as a center, to a desired position of adjustment, and rigidly secured in such position, said means including a casing in which the steering shaft is rotatably mounted, and bolts connecting the casing and frame member, the bolts extending through slots formed in the frame member which slots are curved, respectively, about the point of connection of steering arm and drag link.

5. In a motor vehicle, in combination, a frame member, a steering drag link, a steering shaft, a worm on said shaft, a rock shaft a sector fixed on the rock shaft the teeth of which mesh with those of the worm, a steering arm fixed on the rock shaft to the free end of which the drag link is pivotally connected, a casing enclosing the worm and sector said casing having bearings in which the steering shaft and rock shaft are revolubly mounted, and means for securing the casing to the frame member in any one of a number of positions of adjustment, the casing moving, when such adjustment is being effected along an arc centered at the point of connection of steering arm and drag link.

6. The combination set forth in claim 5 in which the casing and steering arm are positioned on opposite sides of the frame member, and the rock shaft projects through a slot formed in the frame member.

7. The combination set forth in claim 5 in which the casing and steering arm are positioned on opposite sides of the frame member, and in which the casing is secured to the frame member by bolts, said bolts projecting through slots formed in the frame member.

8. In a motor vehicle, in combination, a frame member, a steering shaft carrying a spoked steering wheel, a steering arm to which the steering shaft is connected through an irreversible gearing, a drag link connected to the free end of the steering arm, a casing having bearings in which the steering shaft is revolubly mounted and means whereby the casing may be secured to the frame member in any one of a number of positions so that the angular relationship of the steering shaft and frame member may be altered at will, while the connection between the drag link and steering arm is maintained, the spokes of the steering wheel maintaining a constant angularity for all positions of the steering shaft.

In testimony whereof I hereunto affix my signature.

ALFRED MOORHOUSE.